US008396103B2

(12) United States Patent                  (10) Patent No.:     US 8,396,103 B2
Hirsh                                      (45) Date of Patent:      Mar. 12, 2013

(54) TRANSMISSION CABLE CONTROLLER SYSTEM AND METHOD OF USE

(76) Inventor: Douglas S. Hirsh, Skaneateles, NY (US)

( * ) Notice: Subject to any disclaimer, the term of this patent is extended or adjusted under 35 U.S.C. 154(b) by 738 days.

(21) Appl. No.: 12/564,947

(22) Filed: Sep. 23, 2009

(65) Prior Publication Data

US 2010/0074313 A1      Mar. 25, 2010

Related U.S. Application Data

(60) Provisional application No. 61/136,663, filed on Sep. 24, 2008.

(51) Int. Cl.
    *H03B 17/00* (2006.01)
(52) U.S. Cl. ...................................................... 375/224
(58) Field of Classification Search ................ 375/224, 375/257, 308, 346; 398/135; 341/144, 155
    See application file for complete search history.

(56) References Cited

U.S. PATENT DOCUMENTS

| 6,275,050 B1 | 8/2001 | Born et al. |
| 2003/0143955 A1 | 7/2003 | Van Winkle |
| 2008/0232813 A1* | 9/2008 | Yutani ........................... 398/135 |

FOREIGN PATENT DOCUMENTS

EP            1093239 A1    4/2001

* cited by examiner

*Primary Examiner* — Khai Tran

(74) *Attorney, Agent, or Firm* — Clark & Brody

(57) ABSTRACT

The transmission cable controller system and method of use relates to a microprocessor controlled data cable that is capable of transmitting high volumes of data from many sources on as little as two copper conductors. The cable has the ability to monitor itself and its transmission path for chafing, corrosion, breakdown, and damage. Once a problem has been detected, the system can output a warning signal of any type (audible, visible or a remote warning line) to notify personnel that there is a problem.

18 Claims, 4 Drawing Sheets

TRANSMISSION CABLE CONTROLLER SYSTEM AND METHOD OF USE

This application claims priority under 35 U.S.C. 119(e) based on provisional application No. 61/136,663 filed on Sep. 24, 2008, which is incorporated in its entirety by reference herein.

FIELD OF THE INVENTION

The present invention relates to a transmission cable controller system and method of use, and in particular to a system and method that has the ability to transmit multiple signals through a single conductor, verify transmission acceptance through a secondary conductor, and monitor all aspects of the cable for abnormalities.

BACKGROUND ART

Copper conductors have historically been selected to transmit signals and power over relatively short distances. Until the introduction of fiber optic cables, this was the main source for many of the existing communication networks and data transmission systems. Fiber optics was to be the solution for power loss and bandwidth within the industry, although the anticipated costs were thought to be lower than the copper conductors; in fact the costs became slightly greater.

Additionally, copper conductors are susceptible to line losses due to non-linear loads such as computer systems, or transmission equipment. Line losses are primarily associated with the conductor width, thickness, and length of cable, with each influencing the overall resistance of the network. The resistance and current determine the power dissipation. However the relationship between heat dissipation and temperature rise influence the resistance of the conductor. Therefore, the current carrying capacity of a bare wire or cable is limited by the maximum permissible temperature rise of the conductor under normal operating conditions and is restricted only by the insulation materials encasing the conductor. Many type alternate insulations were introduced to accommodate the heat dissipation of the conductors when under full load conditions, along with indoor environmental controls to compensate for the heat transfer.

Another inherit problem associated with copper conductors is corrosion. In the face of these corrosion problems, apparatus and methods have been developed to detect corrosion such as U.S. Pat. No. 6,275,050 to Born et al., herein incorporated in its entirety by reference. However, systems such as those disclosed in the Born et al. are still problematic for the reasons set forth above.

Therefore, there exists a need to provide improved cables that are capable of efficiently and effectively monitoring the information transmitted over the cable as well as the cable integrity itself.

The present invention responds to this need by providing a transmission cable controller system that has the ability to transmit multiple signals through a single conductor, verify transmission acceptance through a secondary conductor, and monitor all aspects of the cable for abnormalities.

SUMMARY OF THE INVENTION

It is a first object of the invention to provide an improved transmission cable controller system.

It is another object of the invention to provide a method of transmitting information over a cable in a controlled manner to facilitate monitoring of cable performance.

Other objects and advantages will become apparent as a description of the invention proceeds.

In satisfaction of the foregoing objects and advantages of the invention, the invention is an improvement in transmission cables that attempt to monitor and control the information passing through the cables as well as monitoring cable integrity. One aspect of the invention involves a method of transmitting a data stream between an input coupler, a transmission cable, and an output coupler. The invention is an improvement over the prior art by combining the data stream with an analog carrier wave of a designated frequency to form a modified data stream, and transmitting the modified data stream along the transmission cable to the output coupler, and regenerating the data stream for output via the output coupler.

The method can also include checking cable integrity by transmitting and storing a carrier wave in the output coupler and checking the analog carrier wave received at the output coupler against the carrier wave to determine if cable integrity is compromised. If the checking step reveals a compromise of cable integrity, the data stream is either retransmitted one or more times, or the data stream transmission is stopped.

The regenerated data stream can also be compared against the data stream in order to determine if the regenerated data stream should be output.

The invention also relates to a transmission cable controller system comprising an input coupler and a transmission cable with one end of the cable connected to an output of the input coupler. An output coupler is also provided and connected to the other end of the transmission cable. Means for mixing a data stream with an analog carrier wave of a designated frequency to form a modified data stream, transmitting the modified data stream along the transmission cable to the output coupler, and regenerating the data stream for output via the output coupler are provided.

The system can further comprise means for providing a carrier wave that is transmitted and stored in the output coupler and checking the analog carrier wave received at the output coupler against the carrier wave to determine if cable integrity is compromised. If there is a problem with cable integrity, the system employs means for either retransmitting the data stream again or stopping the data stream transmission based on result of the checking of the analog carrier wave against the carrier wave.

The system can also include means for comparing the regenerated data stream to the data stream in order to determine if the regenerated data stream should be output.

BRIEF DESCRIPTION OF THE DRAWINGS

Reference is now made to the drawings of the invention wherein.

DESCRIPTION OF THE PREFERRED EMBODIMENTS

The cable design allows for multiple inputs of various analog or digital signal types, converting all to an inverted serial data stream, amplified, and then combined with an analog carrier wave at a designated frequency utilizing additive mixing. The additive mixing of these signals through FET transistors and a diode ring in this manner is a unique method, which when software driven, can be programmed to allow the output to be recreated; through the inverted assimilation of duplicate carrier wave and thus extrapolating the original multiplexed digital data signal. Once trimmed and upturned the output is reassigned to multiple parallel output ports.

This combination of integral signal generation and analysis will yield an intelligent copper-based or other material conductor cable with the ability to transmit multiple signals through a single conductor, verify transmission acceptance through a secondary conductor, and monitor all aspects of the cable for abnormalities. A remote access port at the input back shell will allow for maintenance activity, as well as field accessibility for programming.

Another advantage of the invention is the ability to use less copper and jacket insulation the materials costs could be lowered by near 15%. Further, the present invention allows multiple signals to be pulsed though a copper conductor and reduce all types of line losses. With the feedback loop built-in to the skin of the cable, the integrity of the network has the ability to self adjust for line loss. It is anticipated that this will decrease line loses by nearly 30%. Additionally, the requirement to control environmental conditions would be greatly reduced, saving additional energy, as the environmental conditions dictate energy consumption as the network is utilized.

Since the features of the invention are built into the interconnections of the network, instantaneous adjustments and compensations reduce the requirement for human monitoring. Programming software for the cable can be easily downloaded, and remotely monitored through simple handheld devices or bridged into a central maintenance system. Personnel requirements for system maintenance can be adjusted accordingly.

The device, in one embodiment, is a dual copper conductor cable that is programmable and integrates real-time or remote maintenance monitoring of cable integrity for multiple signal devices.

Figure 1A:
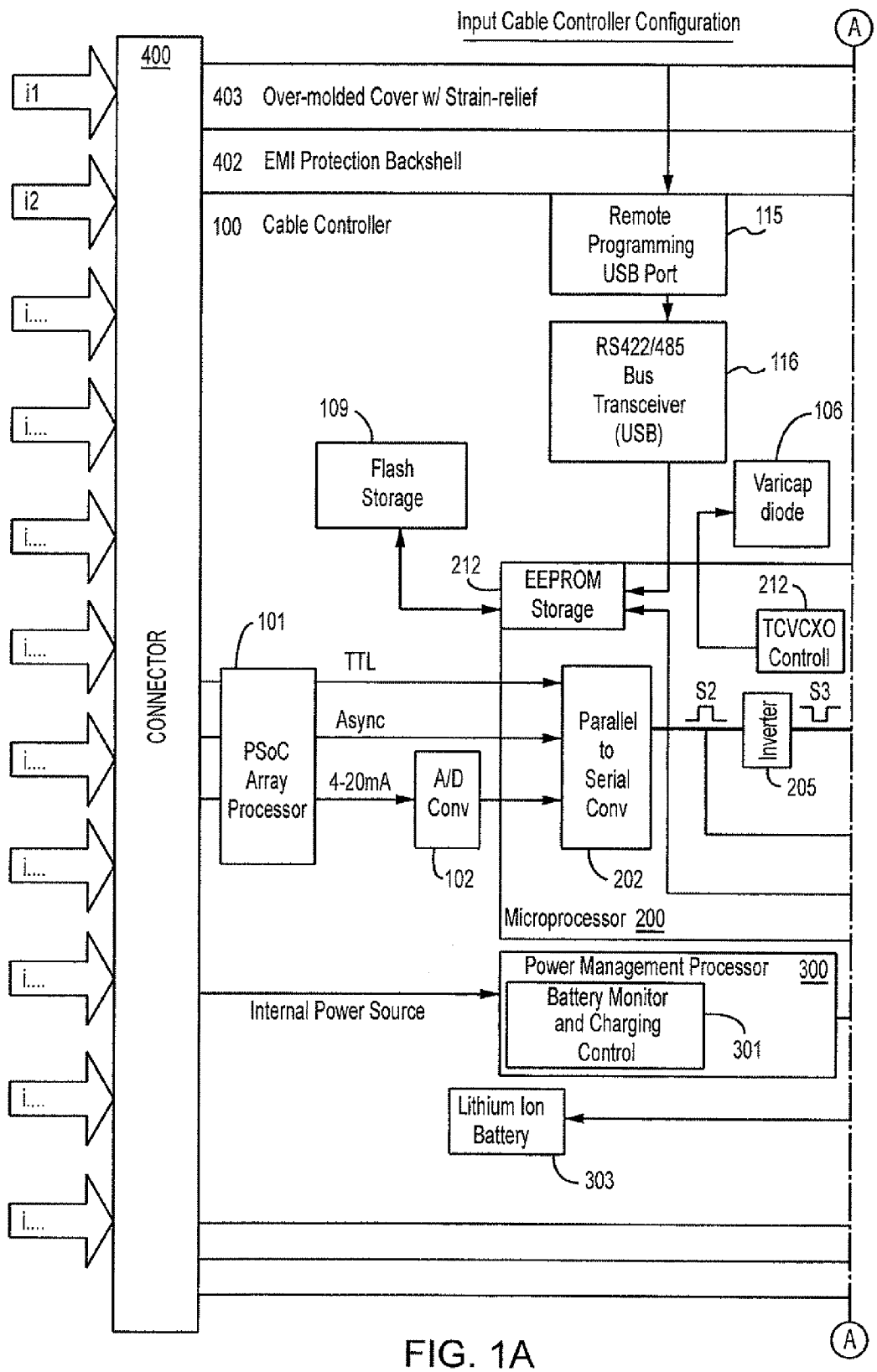
FIGS. 1A and 1B are a schematic view of one embodiment of the invention, showing the input coupler details of the inventive cable.
Figure 1B:
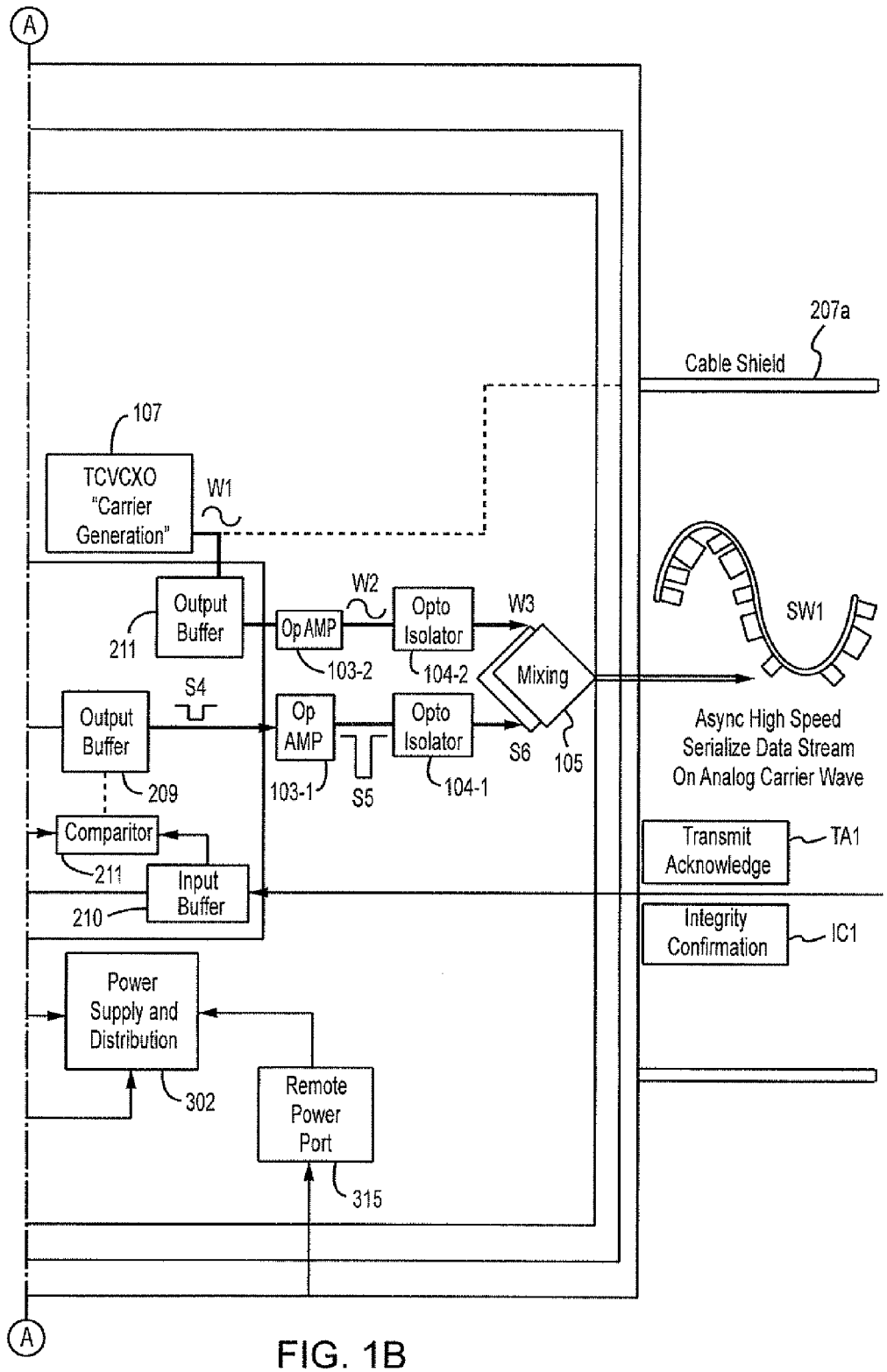
Figure 2A:
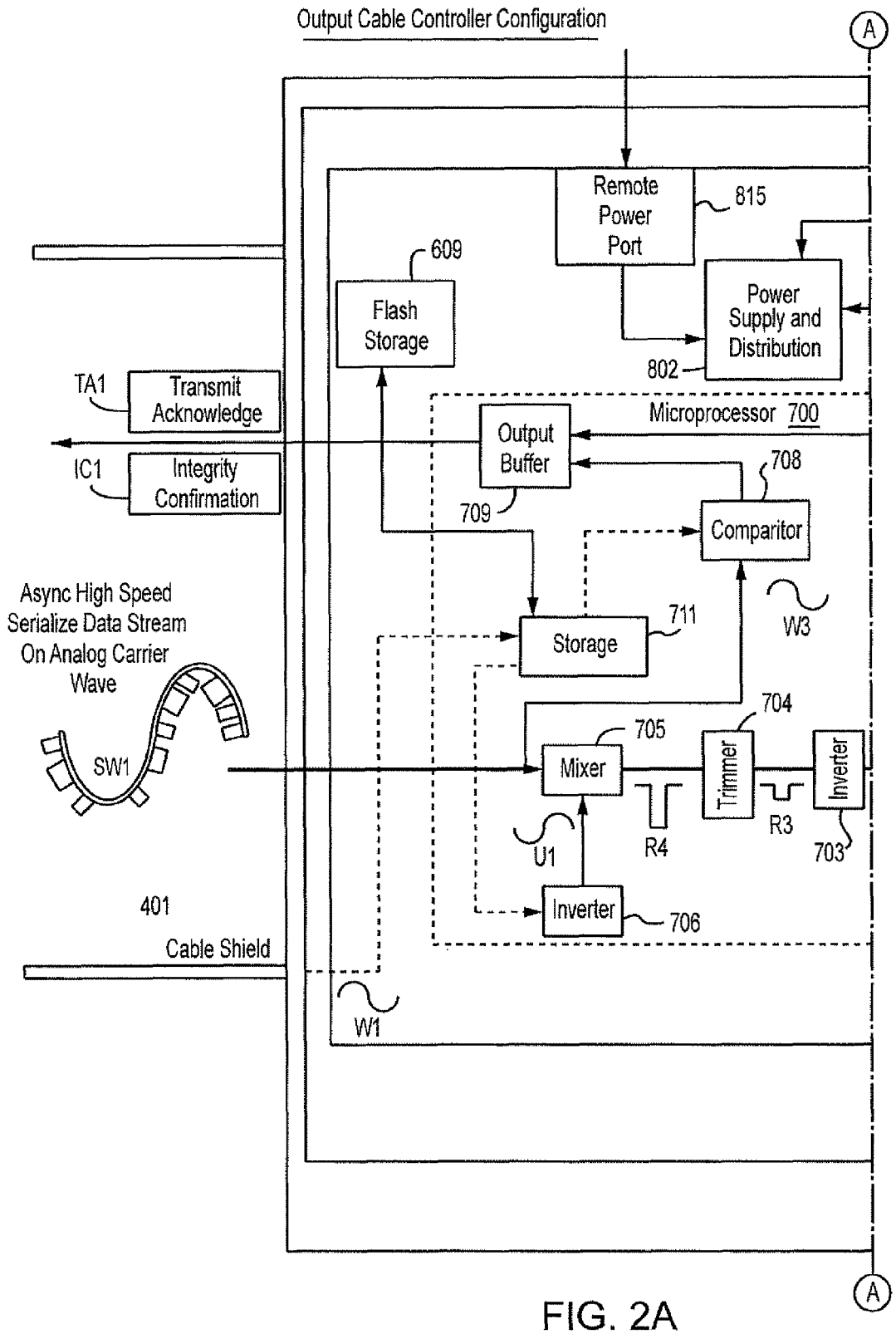
FIGS. 2A and 2B are a schematic view of one embodiment of the invention, showing the output coupler details of the inventive cable.
Figure 2B:
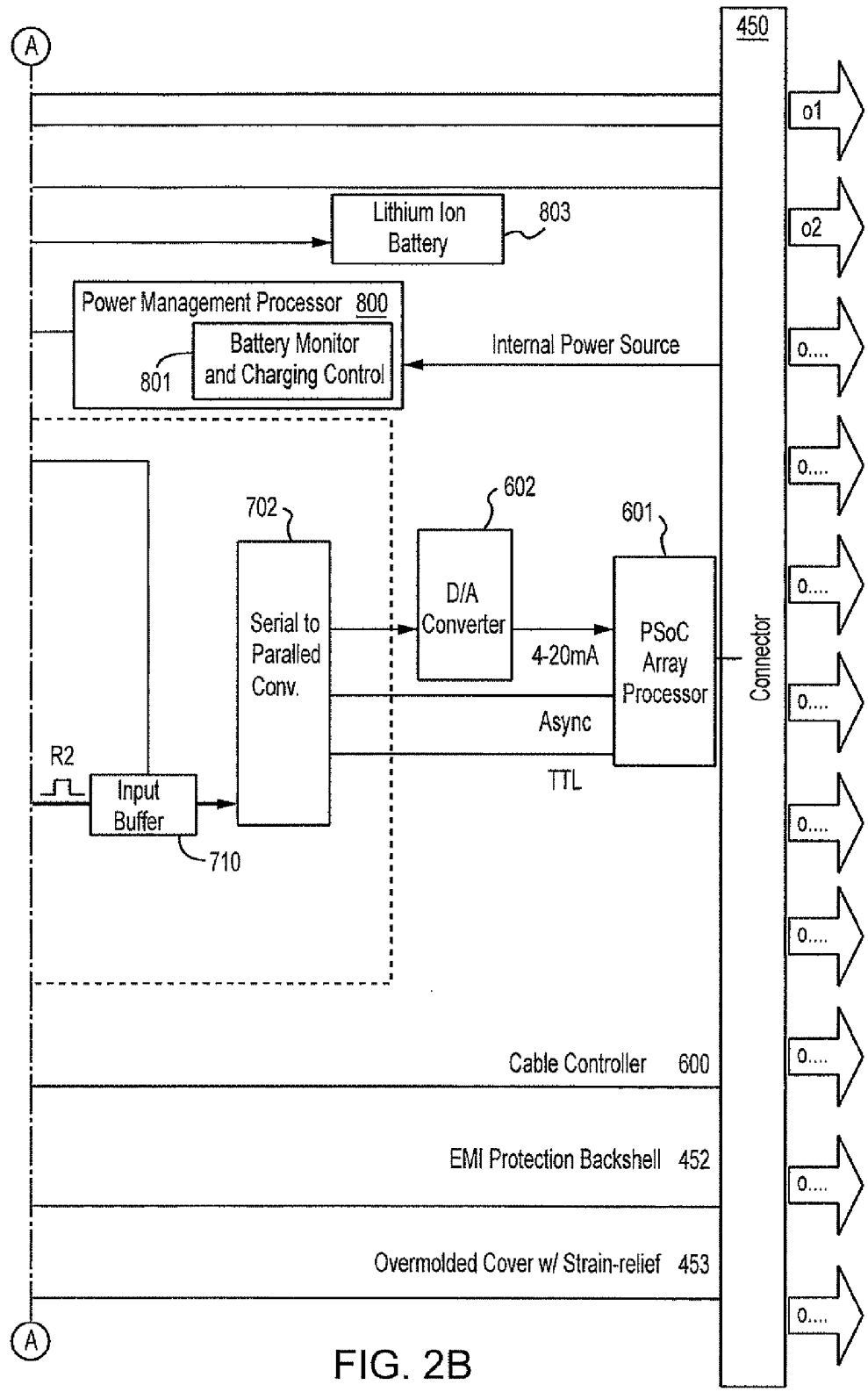

The intelligent cable shown in FIGS. 1 and 2 is capable of handling multiple signals (i1, i2, . . . , ix) of different types through existing established connector styles. The cable input controller (100) establishes the signal integrity through an established interface connector (400) and then processed through a Programmable System on Chip Array (PSoC) (101) based upon the type of signal. Analog signals are transformed to digital through an A/D converter (102), and all signals are converted to a serial data (S2) stream with a parallel to serial conversion (202) within the microprocessor (200). The data stream (S2) is then inverted (S3) and sent to an output buffer (209) before being sent off chip to be amplified, see (103-1). This method of inversion and amplification of the data stream is to eliminate noise interference and insure signal integrity during transmission.

A tunable carrier wave (W1) is generated by TCVCXO controller (212) and processed through a varicap diode (106) to the carrier generator circuitry (107). A finger print of the cable integrity carrier wave (W1) is stored in a permanent buffer (214) to verify cable reliability during each transmission as described below.

The tunable carrier wave (W1) is than amplified at (103-2) to form wave (W2) and isolated at (104-2) to form analog carrier wave (W3).

The inverted amplified serial data stream (S5), through additive mixing circuitry (105) will then combined with the frequency tunable carrier wave (W3) to form a hybrid (SW1), which is an asynchronous high speed serial data stream riding on the analog carrier wave (W3), i.e., a means for mixing a data stream with the analog carrier wave (W3) of a designated frequency to form a modified data stream.

The tuned carrier wave (W1) is transmitted to the output cable processor (700) during the programming stage for permanent storage (711) to monitor cable integrity and carrier wave (W3) breakdown using comparator (706). This can be considered the means for providing a carrier wave (W1) that is transmitted and stored in the output coupler (700) for checking the analog carrier wave (W3) received at the output coupler as part of the modified data stream against the carrier wave (W1) to determine if cable integrity is compromised. The original inputted data stream (S2) will be held within the microprocessor input buffer (210) for later transmit verification through comparator circuitry (211).

As stated above, a finger print of the cable integrity carrier wave (W1) is stored in a permanent buffer (214) to verify cable reliability during each transmission. If an abnormality is detected, the cable input microprocessor (200) is alerted for predetermined maintenance activity, as initially programmed with the input cable controller (100). It should be understood that the tunable carrier wave (W1) can be generated using other and known components than those disclosed above.

Each of the internal devices of the cable controllers (100) and (600) are programmable using Hardware Description Language, however the end user may select a conventional programming language for more convenience. The programming is performed through a remote port (115) through the input controller back shell (402) prior to equipment interconnection of cable.

The cable output controller (600) is automatically programmed during the input controller software download. The tuned frequency of the carrier wave (W1) is stored for permanent retention, see (711). The incoming data stream (SW1) will be phased mixed with an inverted carrier wave (U1); generated from this permanent stored carrier wave (W1), which will allow for the serial data stream (R4) to be regenerated. This data stream is then run through trimming circuits (704) and signal (R3) is upturned through an inverter (703) back to the original form (R2), and stored in the buffer (710) until confirmation is accepted. The deconstructed data stream (R2) is transmitted to output buffer (709). The regenerated serial data stream (IC1) is then feed back to the input buffer (210) controller comparator (211) for verification of data integrity, with the components taking the regenerated data stream back to the input coupler to check cable integrity acting as a means comparing the regenerated data stream to the data stream to check cable integrity. Should the data be corrupted in anyway the input controller (100), will be notified from the output controller (600), and will reprocess the original data stream (S2) for retransmission or stop the transmission, which functions as a means for either retransmitting the data stream again or stopping the data stream transmission based on result of the checking of the analog carrier wave against the carrier wave. Once the verification process is complete, the buffer (710) releases date stream through the serial to parallel converter (702), a D/A converter (602), and processed through the output PSoc Array (601); outputting the original data to the established interface connector (450).

The incoming frequency tuned carrier wave (SW1) is matched to the permanently stored carrier wave (W1). If these waves do not match within a preset limit, the cable integrity may have been compromised. Should the retransmission of the identical data stream signal wave be required multiple consecutive times; the input flash storage registers (109) can store the integrity breach, or through a programming alert the input microprocessor (200) of the breach; which may result in a shut down through the power management system (300), which is also part of the means for controlling the transmission by retransmission or shut down of the transmission. Any stored integrity breaches can be downloaded through the remote programming port (115) to a maintenance system for later analysis.

The cable shield (401) also will have an established carrier wave (W1) established by the input controller (100) and be monitored by the output controller (600) by the comparator (708) for analysis to the baseline fingerprint stored in flash storage buffer (609). This allows the entire cable integrity to be monitored before a system failure occurrence.

Through the programming port (115) of the input controller (100) a maintenance integrity program could be initialized to simulate signal transmission (SW1) and determine cable integrity based upon the pre-stored carrier wave form (W1). This will yield a cable design that can be self-monitoring for integrity, as well as having the ability for a 'quick' maintenance check of the cable, with traceable records of such activity.

The intelligent cable has the ability for primary power to be carried through input internal passed power options (301), remote power option (315), and/or battery power option (303), as well as identical options (801), (803), and (815) for the output controller (600).

The invention can be characterized as a universal smart cable and is a microprocessor controlled data cable that is capable of transmitting high volumes of data from many sources on as little as two copper conductors. One unique aspect of the cable is its ability to monitor itself and its transmission path for chafing, corrosion, breakdown and damage. Once a problem has been detected, it can output a warning signal of any type (audible, visible or a remote warning line) to notify personnel that there is a problem.

Once the end user has an understanding of his/her requirements for interconnection (connector type, pin out, data type, transmission speed), the cable can be preprogrammed either at the manufacturing stage or in the field by the end user via a USB connection and the appropriate software. The end user would simply plug a USB cable into the smart cable and then plug the other end into a laptop, desktop or PDA computer equipped with the necessary software. The software gives the user the option of setting input speed, output speed, number of data pins used, type of data on each line, naming of each data line for future reference as well as data transmission frequency and speed all through a simple, easy to use intuitive software package that can be installed on numerous operating systems such as Windows, Apple, Linux, Android, and other mobile platforms. The software will then run its own test to verify correct operation before installation. After the cable has been installed, it will operate as programmed by the end user and will immediately start transmitting and receiving once installed and a data stream is detected. Another piece of software that can come with the cable system is for maintenance. The cable will be plugged into a computer the same way as it was for programming except the cable will already be installed and in an operational mode (data can be, but does not have to be transmitted during maintenance checks). Maintenance software can be used to check that all data is being transmitted and received properly at both ends as well as the ability to let the user know of any possible problems with the transmission path for both the past as well as present. The field programming described above is well known and does not require further detail for understanding of the invention.

The desired outcome is an intelligent cable, with quick maintenance capabilities, that reduces the weight and bulk size of typical cabling applications.

While the system and method described above transmit a single modified data stream, more than one data stream can be transmitted if so desired. In addition, the modified data stream could be transmitted in either a continuous manner or in a pulsed manner. The transmission of the modified data stream is preferably submitted in a pulsed manner since this mode of operation provides significant energy savings. More particularly, a pulsed transmission reduces the heat generation and energy losses that occur when the modified data stream is transmitted in a continuous manner. Since sending the data stream in either a continuous or pulsed manner involves conventional components and circuitry, a further description of the details of the transmission modes is not necessary for understanding of the invention.

As such, an invention has been disclosed in terms of preferred embodiments thereof which fulfills each and every one of the objects of the present invention as set forth above and provides a new and improved transmission cable controller system and method of use.

Of course, various changes, modifications and alterations from the teachings of the present invention may be contemplated by those skilled in the art without departing from the intended spirit and scope thereof. It is intended that the present invention only be limited by the terms of the appended claims

What is claimed is:

1. In a method of transmitting a data stream between a input coupler, a transmission cable, and an output coupler, the improvement comprising combining the data stream with an analog carrier wave of a designated frequency to form a modified data stream, and transmitting the modified data stream along the transmission cable to the output coupler, and regenerating the data stream for output via the output coupler.

2. The method of claim 1, wherein a carrier wave is transmitted and stored in the output coupler and the analog carrier wave received at the output coupler as part of the modified data stream is checked against the carrier wave to determine if cable integrity is compromised.

3. The method of claim 2, wherein if checking reveals a compromise of cable integrity, the data stream is either retransmitted one or more times, or data stream transmission is stopped.

4. The method of claim 1, wherein the regenerated data stream is compared against the data stream in order to determine if the regenerated data stream should be output or if cable integrity is compromised.

5. The method of claim 2, wherein a warning signal is output if cable integrity is compromised.

6. The method of claim 1, wherein the regenerated data stream is compared to the data stream to check cable integrity.

7. The method of claim 1, wherein more than one modified data stream is transmitted.

8. The method of claim 1, wherein the modified data stream is transmitted in either a continuous or pulsed manner.

9. The method of claim 8, wherein the modified data stream is transmitted in a pulsed manner.

10. A transmission cable controller system comprising:
a) an input coupler,
b) a transmission cable, one end connected to an output of the input coupler,
c) an output coupler connected to the other end of the transmission cable, and
d) means for modifying a data stream with an analog carrier wave of a designated frequency to form a modified data stream, transmitting the modified data stream along the transmission cable to the output coupler, and regenerating the modified data stream for output via the output coupler.

11. The system of claim 10, further comprising means for providing a carrier wave that is transmitted and stored in the output coupler and checking the analog carrier wave received at the output coupler against the carrier wave to determine if cable integrity is compromised.

12. The system of claim 11, further comprising means for either retransmitting the data stream again or stopping the data stream transmission based on result of the checking of the analog carrier wave against the carrier wave.

13. The system of claim 10, further comprising means for comparing the regenerated data stream to the data stream in order to determine if the regenerated data stream should be output or if cable integrity is compromised.

14. The system of claim 11, further comprising means for outputting a warning signal if cable integrity is compromised.

15. The system of claim 10, further comprising means for comparing the regenerated data stream to the data stream to check cable integrity.

16. The system of claim 10, wherein the mixing means forms more than one modified data stream for transmission.

17. The system of claim 10, wherein the modified data stream is transmitted in either a continuous or pulsed manner.

18. The system of claim 17, wherein the modified data stream is transmitted in a pulsed manner.

* * * * *